Feb. 21, 1928.
J. SACHS
1,660,093
INCLOSING SYSTEM FOR ELECTRIC SERVICE APPLIANCES
Filed May 6, 1926
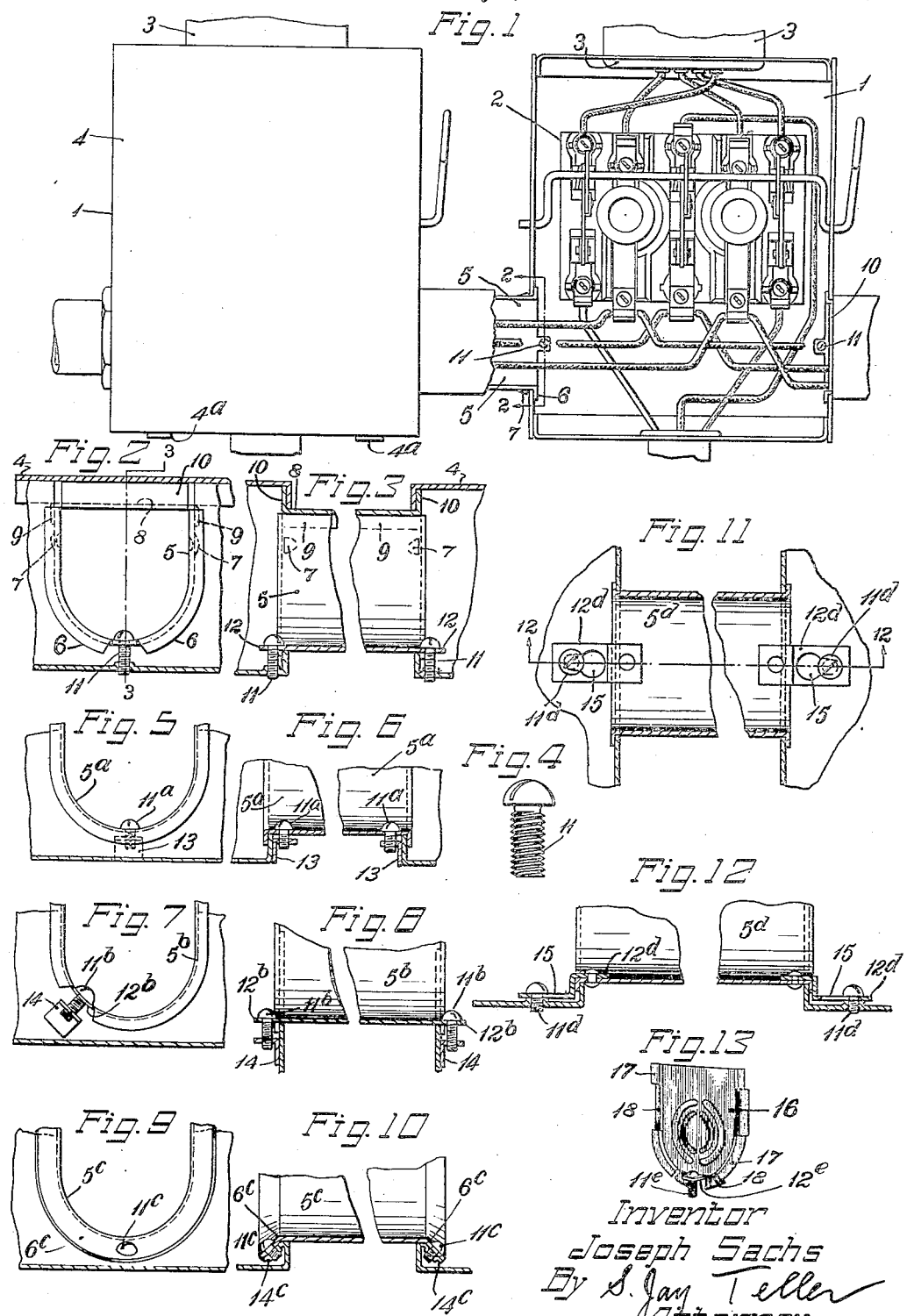
Inventor
Joseph Sachs
By S. Jay Teller
Attorney Patented Feb. 21, 1928.

1,660,093

UNITED STATES PATENT OFFICE.

JOSEPH SACHS, OF HARTFORD, CONNECTICUT.

INCLOSING SYSTEM FOR ELECTRIC SERVICE APPLIANCES.

Application filed May 6, 1926. Serial No. 107,163.

The invention relates to inclosing systems for electrical conductors and service appliances such as are commonly provided for use with multiple lighting service connections, as for instance in stores, office buildings, apartment houses and the like. A system to which the invention is particularly applicable comprises a horizontal series of sheet metal boxes or cabinets adapted for inclosing switches, fuse blocks or other electrical appliances together with open-front horizontal sheet metal troughs for mechanically connecting the cabinets to each other and for inclosing the necessary connecting wires, cables and the like.

The general object of the invention is to provide in a system of the type described improved means for connecting the boxes and the troughs or other attachments together, the said means facilitating the work of assembling or disassembling the system and having other important advantages as will hereinafter fully appear.

Prior to my invention it was the universal practice to connect the cabinets and troughs together by means of screws extending through perpendicular flanges on the troughs, the axes of the screws being parallel with the longitudinal lines of the trough. This means of connecting the trough and cabinets was open to at least two serious objections. One objection was that the screws acting longitudinally of the trough had no tendency to draw the trough backward into firm engagement with the seats provided for it in the cabinets; if the trough was not properly seated, the connecting means did not of itself tend to correct the fault. The other objection was that the screws were not easily accessible and could be put in place, or removed, only with the greatest difficulty, particularly when the space in each cabinet was largely obstructed by the switch, fuse block or other contained appliance or when two or more cabinets were arranged closely adjacent each other.

The specific object of the present invention, therefore, is to provide a fastening means which will be free from the objections incident to the fastening means as before provided. In accordance with the invention I provide fastening means which serve to draw the trough or other attachment rearward into proper and firm engagement with its seat or seats and I also provide fastening means which are easily and directly accessible from the outside of the boxes or cabinets so that assembly or disassembly can be very easily accomplished.

In the accompanying drawing I have illustrated several embodiments of the invention, these several embodiments being described in detail in the specification. It is to be understood, however, that the specific disclosures appearing in the drawing and in the specification have been selected merely for purposes of clearly illustrating the invention and are not to be construed as defining or limiting the scope thereof, the claims forming a part of the specification being relied upon for that purpose.

Of the drawing,

Fig. 1 is a front view showing a series of boxes or cabinets with troughs between them connected in accordance with the invention, the cover of one of the cabinets being omitted to show the interior.

Fig. 2 is an enlarged fragmentary view taken along the line 2—2 of Fig. 1 and showing the connecting means between the trough and the cabinet.

Fig. 3 is a fragmentary longitudinal sectional view taken along the line 3—3 of Fig. 2.

Fig. 4 is an enlarged detail view of one of the fastening screws.

Figs. 5 and 6 are views similar respectively to Figs. 2 and 3 but showing an alternate embodiment of the invention.

Figs. 7 and 8 are views also similar respectively to Figs. 2 and 3, but showing another alternate embodiment of the invention.

Figs. 9 and 10 are views also similar respectively to Figs. 2 and 3, but showing still another alternate embodiment of the invention.

Fig. 11 is a fragmentary front sectional view showing a trough and parts of two cabinets, the trough and cabinets being connected by means constituting a still different embodiment of the invention.

Fig. 12 is a fragmentary longitudinal sectional view taken along the line 12—12 of Fig. 11.

Fig. 13 is a perspective view of a closure for the opening in the box wall, this closure having a fastening means embodying the invention.

In accordance with the invention, two or more similar cabinets 1, 1 are provided, each adapted for inclosing a switch, fuse block or other electrical appliance. Two such cabinets are shown in Fig. 1, these being arranged to form a part of a horizontal row or series in proper spaced relationship. The front cover of one cabinet is omitted so as to show the interior. Located within each of the cabinets is an electrical appliance 2 and, as illustrated, this appliance is a combined fuse block and switch, such as disclosed in my Patent No. 1,479,012 dated January 1, 1924. The appliance does not of itself constitute any part of the invention and no detailed description thereof is necessary.

As indicated at 3 a meter may be associated with the cabinet preferably having its lower portion projecting into the cabinet through an aperture in the top wall. Suitable electric connections are provided between the meter 3 and the appliance 2.

The cabinets 1, 1 are made from sheet metal and each of them has a movable front cover 4, which is preferably hinged to the lower end wall as shown at 4ᵃ.

Provision is made whereby the adjacent side walls of each pair of adjacent cabinets are or may be formed with open-side openings therein extending from the front of the cabinet and preferably U-shaped. These openings are of the proper size and shape to receive and form seats for a trough 5. The trough 5 serves as a wire-way for wires extending between the cabinets as clearly shown in Fig. 1. The openings for the trough are preferably formed by the removal of knock-out portions from the side walls of the boxes, but it is to be understood that I do not so limit myself and that the cabinets may be provided with permanent openings formed during the initial manufacture thereof.

Each of the troughs 5 is formed with flanges 6, 6 at its ends, these flanges preferably being perpendicular to the longitudinal lines of the trough and being adapted to engage the inner surfaces of the adjacent side walls of the corresponding cabinets. Each of the troughs is preferably also formed with outward projections 7, 7 which engage the outer surfaces of the side walls of the cabinets. It will be seen that the flanges 6, 6 together with the projections 7, 7 enable the troughs to serve as means for positively spacing the cabinets and maintaining them at the desired distances from each other. Preferably there are provided for the respective troughs covers 8, 8 each having inward turned flanges 9, 9 at the top and bottom and outward turned flanges 10, 10 at the ends. These covers 8, 8 are held in place by the covers 4, 4 for the cabinets.

In accordance with the invention I provide in association with each end of each trough a fastening device which serves to apply force to the trough to move it towards the rear of the corresponding cabinet. These devices serve not only to insure the proper location of the trough in the U wall openings which form seats therefor, but also serve to prevent any accidental removal of the trough after it is once in place. Preferably these devices not only serve to mechanically connect the troughs and cabinets but they also serve as electrical bonding means therefor.

Preferably each of the fastening and bonding devices comprises a rotatable threaded member arranged with its axis at such an angle to the plane of the back of the cabinet that access to the said member may be had from the exterior of the cabinet along a straight line constituting a continuation of said axis. Ordinarily and preferably the rotatable threaded member is a screw adapted to be turned by means of a screw driver.

A shown in Figs. 1, 2 and 3 there are two screws 11, 11 for each trough, each arranged with its axis approximately perpendicular to the backs of the cabinets. Each trough 5 is provided at each end with an ear 12 which projects longitudinally beyond the end of the trough proper and which is provided with a screw hole therein. The back of each cabinet is provided with a threaded screw hole adapted to register with the screw hole in the corresponding ear 12, and the trough can therefore be forced into place and held there by inserting the screws 11, 11 through the holes in the ears 12, and threading them into the holes in the backs of the cabinets. It will be understood from the drawing that the screws 11, 11 serve to draw the trough backward so as to insure its full and proper engagement with its seats. It will also be clear that the screws are readily accessible so as to facilitate the rapid connection or disconnection of the trough to or from the cabinets. Inasmuch as the axis of each screw is at a considerable angle at the back of the cabinet access to the screws may be readily had for the rotation thereof by means of a screw driver. In turning the screw, the screw driver projects forward to the front of the cabinet so that it can be easily operated without any interference.

Preferably each of the screw receiving portions of the trough, in this case the ear 12, is threaded to receive the corresponding screw 11, and, as shown in Fig. 4, the screw is provided with an annular groove adjacent the head to permit the screw to freely rotate after being threaded into place.

Preferably the screw is initially formed without the groove and is assembled with the trough by being threaded into place as stated. Rotation of the screw is continued after the head thereof engages the trough, thus stripping the threads on the screw and forming the required groove. Thus the screw is free to turn without endwise movement, but is positively attached and is held from falling out of the trough during shipment and handling.

In Figs. 5 and 6 I have shown another embodiment of the invention wherein the screws 11ª, 11ª are located outside of the cabinets instead of inside. As shown in these figures the trough 5ª is provided with screw holes in the body thereof near the ends and the cabinets are provided with ears 13, 13 having threaded screw holes therein adapted to register with the holes in the troughs. It will be obvious that the screws 11, 11 can be easily put in place or removed and that they have the same functions as the screws shown in Figs. 1 to 3.

While I prefer and have shown screws located with their axes perpendicular to the back of the cabinet, this exact location is not essential. The screws can be located each with its axis at an acute angle to the back of the cabinet, but in a plane perpendicular to the longitudinal lines of the trough as shown in Figs. 7 and 8; or the screws can be located each with its axis at an acute angle to the back of the cabinet and also at an acute angle to the longitudinal lines of the trough as shown in Figs. 9 and 10. In either case the screws are located at such an angle that they serve to draw the trough rearward into firm and proper engagement with its seats, and in each case the angle is such that a screw driver located along a straight line constituting a continuation of the axis of the screw will be so positioned as to be freely operable without interfering with the walls of the cabinet or with any of the parts contained therein.

As shown in Figs. 7 and 8 the trough 5ᵇ is provided with ears 12ᵇ, 12ᵇ, similar to the ears 12, 12 but located at one side of the center of the trough. The cabinets are provided with lugs 14, 14 having threaded holes therein adapted to register with the holes in the ears 12ᵇ, 12ᵇ.

As shown in Figs. 9 and 10 the trough 5ᶜ is provided at its ends with flanges 6ᶜ, 6ᶜ which are at less than a right angle to the longitudinal lines of the trough, the angle, as shown, being approximately 45°. Screw holes are provided in the flanges and the cabinets are provided respectively with flanges 14ᶜ, 14ᶜ which are at approximately the same angle as the flanges 6ᶜ, 6ᶜ and which are provided with threaded holes adapted to register respectively with the holes in the flanges. Screws 11ᶜ, 11ᶜ are provided and it will be seen that when the screws are tightened they serve to draw the trough backward into proper engagement with its seats. Inasmuch as each of the screws 11ᶜ, 11ᶜ is located with its axis at a considerable angle to the back of the cabinet, it can be readily engaged by a screw driver located along a straight line constituting a continuation of the said axis. A screw driver so located will be entirely free for operation without intering with the walls of the cabinet or with any other parts.

In Figs. 11 and 12 I have shown an embodiment of the invention which differs in important respects from any of the other embodiments. As shown in these figures the trough 5ᵈ is similar in general construction to the trough 5, but the projections 7, 7 are omitted. The trough 5ᵈ is provided at its ends with ears 12ᵈ, 12ᵈ, each having a bayonet opening 15 therein. The larger portion of each opening 15 is adjacent the trough proper and is large enough to receive the head of a screw 11ᵈ. Each of the cabinets is provided with a threaded hole for receiving the corresponding screw 11ᵈ, these screws being put in place in the cabinet before assembling the cabinets and troughs together.

In building up a series of cabinets and troughs having this embodiment of the invention it is desirable to first permanently put in place a cabinet at one end of the series as for instance the left-hand end. Then the next cabinet to the right can be approximately located and the connecting trough put in place, the ears 12ᵈ, 12ᵈ being passed over the screws. Then the second cabinet is moved to the right so as to cause the screws to enter the smaller portions of the holes 15, 15. This serves to determine the spacing between the two cabinets and the second cabinet can then be permanently secured in place and the screws 11ᵈ 11ᵈ can be tightened to force the trough backward into firm contact with its seats and to hold it against removal. If at any time it should be necessary to disassemble the series of cabinets or troughs, this can be done by reversing the operations which have been described, or any single trough can be removed from the series by entirely removing the screws 11ª, 11ª from the corresponding cabinets.

In Fig. 13 I have shown an attachment in the form of a plate or slide 16, which may be used for closing one of the open-side openings in the cabinet when a trough is not required. This plate is shaped to fit the opening and is provided with suitable means such as lugs 17 and 18 respectively arranged to engage the inner and outer sides of the cabinet wall. The plate is also provided with means whereby it may be moved or drawn rearward and held in its innermost position. This means preferably is similar to that shown in Figs. 2 and 3 in connection with the trough 5. As shown the plate 16 is provided with an ear 12ᵉ similar to one of the ears 12, 12 on the trough 5. The hole in this ear receives a screw 11 and this screw can enter the threaded hole in the back of the cabinet already described in connection with Figs. 2 and 3. Thus the plate 16 is moved into place and held against removal in the same way that the trough 5 is moved and held as hereinbefore described.

What I claim is:

1. For an electrical appliance receiving cabinet having an open-side opening in one wall extending from the front thereof, an attachment shaped to enter and approximately fit the opening in the wall and including means positively attached thereto and adapted to engage the cabinet and to thereby tend to draw the attachment rearward into firm engagement with the edges of the opening.

2. For an electrical appliance receiving cabinet having an open-side opening in one wall extending from the front thereof, an attachment shaped to enter and approximately fit the opening in the wall and including a rotatable threaded member adapted to enter a threaded hole in the cabinet and so located as to have its axis approximately perpendicular to the back of the cabinet when the attachment is in place.

3. For connecting two similar electrical appliance receiving cabinets respectively having in adjacent walls similar open-side openings extending from the fronts thereof, the combination of a trough shaped to enter and approximately fit the said openings to form a wire-way between the cabinets, and means at the ends of the trough adapted to engage the respective cabinets and to thereby tend to draw the trough rearward into firm engagement with the edges of the openings.

4. For connecting two similar electrical appliance receiving cabinets respectively having in adjacent walls similar open-side openings extending from the fronts thereof, the combination of a trough shaped to enter and approximately fit the said openings to form a wire-way between the cabinets, and rotatable threaded members positively attached to the trough adjacent the respective ends thereof and adapted to enter threaded holes in the respective cabinets, the said threaded members being so located that their axes are at considerable angles to the backs of the cabinets when the trough is in place.

5. In an inclosing system of the type described, the combination of an open-front cabinet adapted for containing an electrical appliance and having in one side wall an open-side opening extending from the front thereof, a conduit trough extending into and approximately fitting the said opening, and a mechanical fastening device connecting the cabinet and the trough and serving to apply force to the trough tending to move it toward the rear of the cabinet.

6. In an inclosing system of the type described, the combination of an open-front cabinet adapted for containing an electrical appliance and having in one side wall an open-side opening extending from the front thereof, a conduit trough extending into and approximately fitting the said opening, and a mechanical fastening device connecting the cabinet and the trough and comprising a rotatable threaded member arranged with its axis at such an angle to the back of the cabinet that access to said member may be had from the exterior of the cabinet at the front thereof along a straight line constituting a continuation of the said axis.

7. In an inclosing system of the type described, the combination of an open-front cabinet adapted for containing an electrical appliance and having in one side wall an open-side opening extending from the front thereof, a conduit trough extending into and approximately fitting the said opening, and a mechanical fastening device connecting the cabinet and the trough and comprising a rotatable threaded member positively attached to the trough and arranged with its axis approximately perpendicular to the back of the cabinet.

JOSEPH SACHS.